United States Patent [19]
Ekstrom

[11] 3,968,419
[45] July 6, 1976

[54] DIRECT CURRENT TRANSMISSION AND METHOD OF OPERATING THE SAME

[75] Inventor: Ake Ekstrom, Ludvika, Sweden

[73] Assignee: Allmanna Svenska Elektriska Aktiebolaget, Vasteras, Sweden

[22] Filed: Mar. 13, 1975

[21] Appl. No.: 558,158

[30] Foreign Application Priority Data
Mar. 15, 1974  Sweden .......................... 7403479

[52] U.S. Cl. ............................................. 321/27 R
[51] Int. Cl.² ............................................ H02M 7/00
[58] Field of Search ............................. 321/11, 27 R

[56] References Cited
UNITED STATES PATENTS

| | | |
|---|---|---|
| 3,536,985 | 10/1970 | Ekstrom .......................... 321/27 R |
| 3,543,045 | 11/1970 | Hammarlund et al. .......... 321/27 R |

Primary Examiner—William M. Shoop

[57] ABSTRACT

In the operation of a bipolar direct-current transmission system having bipolar convertor stations with earthed center taps and transmission lines connecting the stations, one for each polarity, in which system in the event of disconnection of one pole of the stations the corresponding pole of the transmission line is connected as a return conductor for the remaining pole, in order to load the return connector with current and discharge the ground connections between the stations, the current of the corresponding pole in one of the stations is increased to the same value as the pole in operation, and thereafter the ground connection of such corresponding pole is interrupted.

9 Claims, 4 Drawing Figures

DIRECT CURRENT TRANSMISSION AND METHOD OF OPERATING THE SAME

BACKGROUND OF THE INVENTION

1. Field of the Invention

The present invention relates to a method of operation of bipolar direct-current transmission system.

2. The Prior Art

Such a transmission system usually comprises two bipolar static convertor stations the center taps of which are earthed and which are connected to each other by means of two transmission lines, namely a positive and a negative conductor. The invention relates to such a transmission where both conductors are used also in single-pole operation, that is, after disconnection of one pole of the stations. In this way an earth-return conduction is avoided. The invention also relates to the direct-current transmission system itself.

As long as a bipolar direct-current transmission is working in normal operation, the two conductors conduct substantially the same current and the ground connections of the stations are substantially currentless or conduct relatively low currents for a relatively short time. These ground connections therefore do not have to be designed for a current load of any great magnitude or for a long period during normal operation.

However, if one pole of the transmission is cut off, the second one has to have some form of return conductor, and it may be inconvenient then to have to dimension the ground connections for this, and it can also be impermissible considering the resulting earth currents. For this reason, the plants are often planned so that, in single-pole operation, the free conductor is used as the return conductor. The simplest way to do this is to provide each pole in the stations with by-pass members, and in this case it is possible to use the normal by-pass members of the individual convertors as the return conductors.

When the free conductor is connected as a return conductor, the ground connection in one station must be broken since, particularly, in the case of long overhead lines, the conductor resistance is much higher than the ground resistance. In the first place, therefore, the transmission current will pass through the ground connection and, in order to disconnect this connection in a simple manner, it should first be made practically currentless. Previously this has been done by reducing the current to zero in the convertor of the remaining pole, which however causes a temporary interruption in the whole transmission.

SUMMARY OF THE INVENTION

The invention relates to a method of causing the current in the ground connection to commutate over to the connected return conductor, after which the ground connection in one station can be cut out by means of an ordinary breaker or isolator. According to the invention, this current commutation is performed by temporarily increasing the current in a convertor in the disconnected pole to the same current as in the remaining pole, whereupon one ground connection is disconnected. Before disconnecting the ground connection, the current in this connection is measured and the disconnection is made when the current is substantially zero in the corresponding breaker member. When increasing the current in the corresponding pole, one part of the pole is controlled towards rectifying and the other part towards inverting operation. When increasing the current of a pole, the current is increased to a value which is alternately greater than and less than that of the pole which is in operation. When increasing the current of the pole, the voltage in the pole is maintained within certain low limits, for example by limiting the delay angle to a range of around 90°.

The invention also contemplates a system for carrying out the method described above.

BRIEF DESCRIPTION OF THE DRAWINGS

The method and an embodiment of the transmission system will be explained in more detail with reference to the accompany drawings, in which.

DESCRIPTION OF THE PREFERRED EMBODIMENTS

Figure 1:
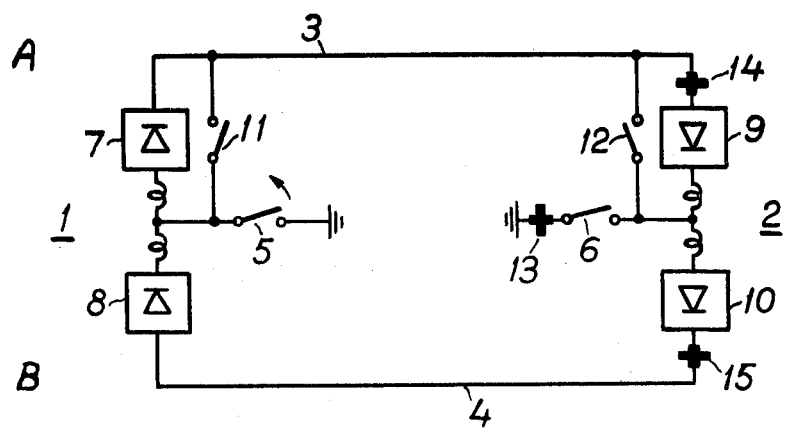
FIG. 1 shows a bipolar direct-current transmission.

The transmission according to FIG. 1 comprises two convertor stations 1 and 2 connected to AC networks (not shown) and connected to each other by means of two conductors 3 and 4. The upper part of the transmission is called pole A, the lower part pole B. Each station comprises two static convertors 7, 8 and 9, 10, respectively, and the center taps therebetween can be connected to earth through breakers or isolating switches 5, 6. Further there are shown smoothing reactors between the convertors and the center taps. During normal two-pole operation, both breakers 5 and 6 are closed. For convertors 7 and 9 in pole A there are shown by-pass members 11 and 12, respectively. The convertors 8 and 10 in pole B have similar by-pass members, but these are not shown.

Disconnection of a convertor, for example in case of fault or service, is done in a known manner by blocking and by-passing the convertor. Simultaneously, a convertor in the corresponding pole in the other station is normally disconnected in the same manner, in order to ensure a balance between the stations and thus a stable operation. If the transmission only contains one convertor in each station and pole, this pole will have no voltage and the return current for the second pole tends to flow through the ground connection.

To make the return current flow in the conductor of the free pole, the invention provides several possible methods, and as an example it is assumed that the pole A is made voltageless by the fact that the convertors 7 and 9 are disconnected and bridged.

If a convertor is to be disconnected for servicing, one of the breakers 5 or 6 can quite simply be opened before closing the by-pass switches 11 and 12, 5 and 6 being substantially currentless on the occasion of breaking. In order to fix the line voltage in relation to earth, only one of the breakers 5 or 6 should be opened.

If it is a question of disconnection of a convertor, for example 7, because of a fault, by closing 11 the current control can be retained on 9. If the station 2 is a rectifying station, a closing of 11 will cause an increase in current in pole A, whereas if 2 is an inverting station the current in pole A will decrease. In both cases the control of station 9 will reduce the voltage of this station to a low value corresponding to the preset current value in line 3, and, since this current value is usually set at an equal value in both poles, the ground connections will remain currentless so that 5 or 6 can be opened. After this 12 is closed and 9 blocked so that the pole B obtains a return conductor formed of 11, 3 and 12. In this procedure consideration must be paid to the fact that a reduction of the voltage in one pole in most cases causes the line protection system to reduce the current as well, and therefore the procedure as a rule requires special measures in the normal line protection system. This is described in more detail in connection with FIG. 3.

Furthermore, a fault in one pole in many cases leads to repeated blocking and deblocking of the convertor of that pole in the attempt to remedy the fault and if this does not succeed the convertors are completely blocked. To introduce a disconnection of 5 or 6 in this procedure is often inconvenient, so a disconnection of one pole involves blocking of the whole pole while at the same time 5 and 6 remain closed. Because of its lower resistance, the ground connection will then act as conductor for the principal current whereas 3 will be substantially currentless and the main problem is thus to make the current commutate over to 3.

For this purpose a faultless convertor, for example 9, is deblocked in pole A and 12 is opened. The current in 9 is increased to the same value as in pole B, the current thus growing up in line 3, whereas the ground connection will be currentless and can be disconnected at 5 or 6. After this, 12 can be closed again and 9 be blocked. The deblocking of 9 and the opening of 12 can be performed, for example, as described below in connection with FIG. 4.

Before one of the breakers 5 or 6 is opened, it should be ensured that it is without current, which can be done by measuring the current in the ground connection itself, for example at 13, which indicates a measurement transductor, or by measuring the current difference between 3 and 4 with the help of the measuring members 14 and 15.

It is clear that all switching operations are carried out without affecting the operation of pole B.

Which of the above-mentioned methods is most suitable depends on the construction of the plant in other respects and should be selected in each individual case. Thereafter the various steps should be programmed in an automatic control device, possibly in dependence on whether it is a question of planned switchings, for example for service, or if it is a question of a switching because of a fault in a pole.

Reconnection of a pole is made in a conventional manner by connecting and deblocking each convertor separately.

The commutation of current from the ground connection to the conductor 3 in the above example is performed, as mentioned, by increasing the current in 9 to the same value as the value of the current in the lower pole B. Thus, a commutation current is to start growing in the circuit 9, 6, 5, 11, 3, 14 and, since this circuit has a relatively low resistance, only a relatively low increase of the voltage in 9 is necessary, and this convertor will therefore cause quite a strong reactive load on the appropriate AC network during the switching operation.

This can be avoided if the convertor 9 is controlled according to the principles shown in U.S. Pat. No. 3,641,356. This means in practice that one part of 9 operates as a rectifier, whereas the other part operates as an inverter and this is possible whether 9 comprises two separate, series-connected convertors or if it only comprises one single rectifier bridge, the two commutating groups of which are controlled with different delay angles.

Whatever manner is chosen to control the convertor 9, it must be taken into account that a ripple will occur in the current in the above-mentioned commutating circuit so that the current in 5 and 6 may have an alternating component and zero passage. However, this is an advantage in breaking from a technical point of view. Possibly the current order to 9 may be varied so that the current in 9 is alternately greater and lower than the current in the other pole, thus obtaining distinct zero passages in the ground current.

Further it should be ensured that the voltage in 9 cannot assume higher values when 5 or 6 has been opened, since such higher voltages may lead to overvoltages in the ground connection that has just been interrupted. The voltage in 9 is suitably limited by limiting the delay angle in 9 to a range around 90°.
An other possibility were to start convertor 9 according to the principals of our co-pending application corresponding to our Swedish application F404602-0.

In FIG. 1 and in the above description, the members 11 and 12 have primarily been said to constitute individual by-pass switches for the individual convertors, which can be somewhat impractical. If, for example, each pole in the convertors contains several series-connected convertors, these should be provided each with a by-pass switch while the same time, in each station for each pole, there is arranged a particular by-pass switch for the whole pole. The individual by-pass switches for the convertors must be constructed in accordance with the normal requirements for these regarding breaking capacity, operational speed, and the like, whereas the by-pass switches for entire poles can be constructed as simpler isolating switches without particular demands on speed and breaking capacity. Which form of by-pass switch to use for the poles is, however, of less importance for the invention which relates to the breaking of a ground connection to secure a metallic return conductor for the remaining pole.

Figure 2:
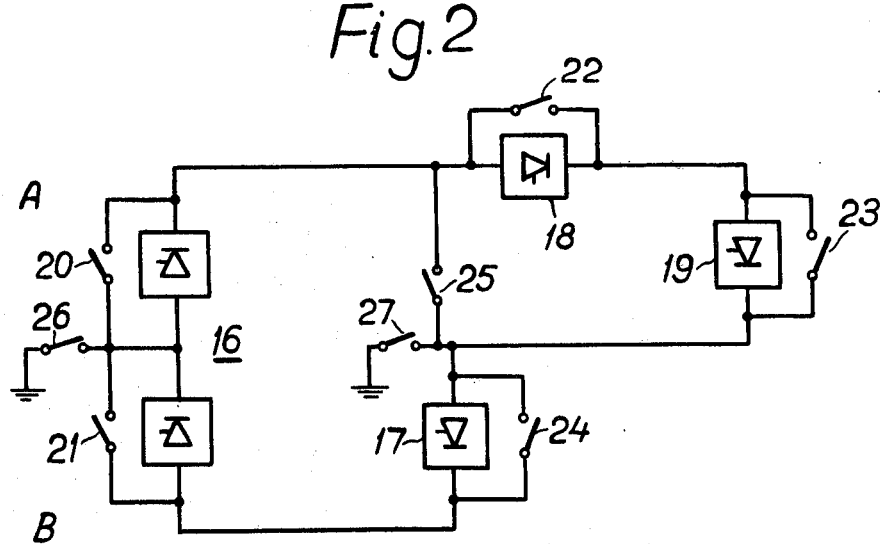
FIG. 2 shows a variant thereof.

FIG. 2 shows how the invention can be applied to transmissions having several stations 16 – 19. In pole A the stations 18 and 19 are connected in series and intended for sellective connection by opening the corresponding by-pass switch 22 or 23. In this way, one of the stations 18 or 19 will cooperate with pole A in station 16. In bipolar operation both ground switches 26 and 27 are closed. When pole A is disconnected the by-pass switches 20 and 25 are closed and 26 or 27 is broken.

The arrangements of FIGS. 1 and 2 can be combined so that the respective poles A and B are connected together and many other variants are feasible.

Figure 3:
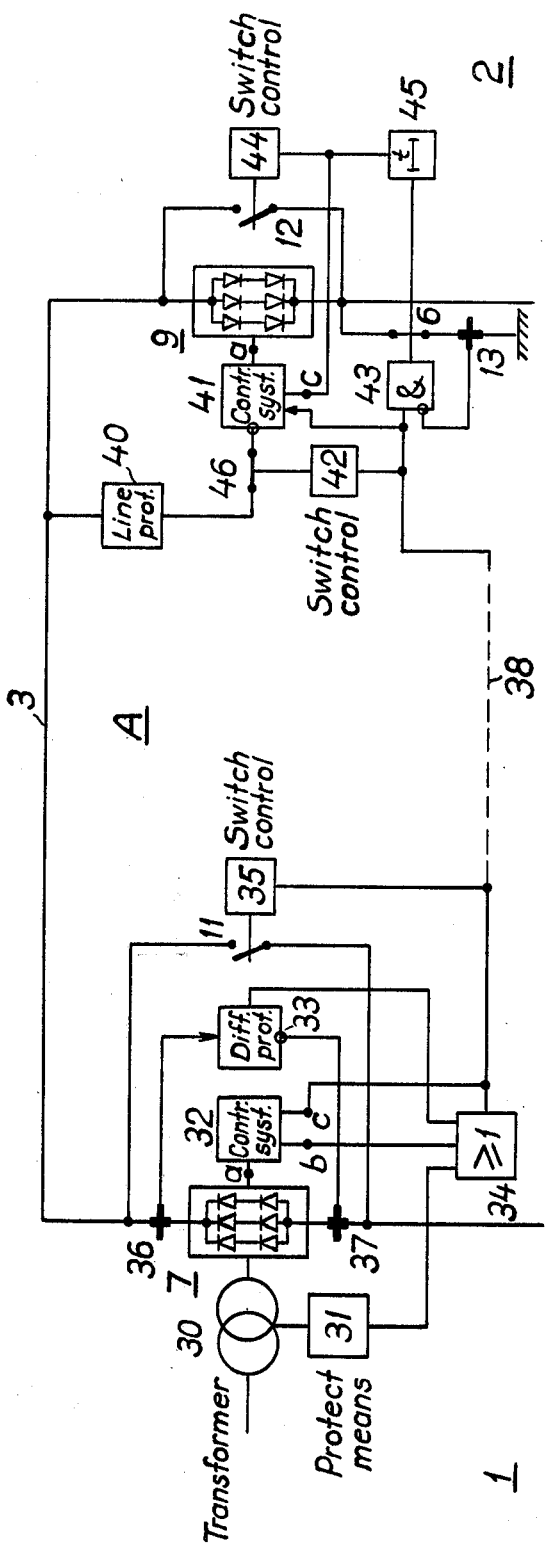
FIGS. 3 and 4 show details of FIG. 1.

FIG. 3 shows the upper pole A of FIG. 1 with signal paths and operation sequences in more detail.

Convertor 7 is provided with a convertor transformer 30 with protection means 31 comprising means for sensing temperature, oil level, gas, current and so on. Further, convertor 7 has a control system 32, for instance according to U.S. Pat. No. 3,551,778, with an output a for control pulses to the rectifiers of 7. Control system 32 is normally provided with some kind of protection for internal earth faults and overcurrents and the like with an indication output b. Further, 32 is provided with a blocking input c, for instance for disconnection of output a.

Convertor 7 is further provided with some kind of earth protection for its main circuits, for instance a current differential protective means 33 connected to current measuring means 36 and 37, for instance transducers, on both sides of the convertor. If the current values from 36 and 37 are different, there must be an insulation fault within convertor 7 and 33 will given an output signal.

The signals from 31, 32 and 33 are collected in an OR-gate 34 so that an input signal on this gives an output signal blocking the control system 32 and releasing the switch control 35 so that by-pass switch 11 is closed.

The signal from 34 is also transmitted to convertor 9, for instance over a telelink 38 in order to ensure that one of the earth connections 5 or 6 is opened when the current is zero.

Convertor 9 is provided with a control system 41, normally like 32, in accordance with the above U.S. Pat. No. 3,551,778. In FIG. 3, 41 is connected to a line protection system 40, for instance according to U.S. Pat. No. 3,036,257 for blocking convertor 9 is case of a line fault. However, a fault in convertor 7 may be sensed as an earth fault by system 40 so that in case of a signal from 34 system 40 will be disconnected from 41 so that the control of convertor 9 is maintained until earth switch 6 is opened. Therefore the signal from 34 influences switch control 42, opening switch 46 and disconnecting 40 from 41.

The signal from 34 is also connected to an AND-gate 43 for opening switch 6 when the current signal from transducer 13 is zero. The signal from 43 is also sent to switch control 44 for closing by-pass switch 12 and to blocking input $c$ on control system 41 for disconnecting the pulses over output a just like control system 32. The signal from 43 to 41 and 44 is delayed in delay means 45 in order to ensure the opening of switch 6.

As mentioned in the above U.S. Pat. No. 3,551,778, control system 41 is normally provided with limit means for the control angle of the control pulses over terminal a. In order to prevent over-voltages and over-currents during the exceptional circumstances described here, it may be desirable to narrow said limits which can be done by letting the signal from 34 influence said limit means. Further, the current control of 41 in this case is carried out in the way described in connection with FIG. 4.

Instead of influencing switch 6, the AND-gate 43 can be arranged in station 1 for opening of switch 5, which then is series-connected with a transducer corresponding to 13.

As mentioned earlier, transducer 13 can be replaced by 14 and 15 in connection with a subtracting device.

According to FIG. 3, both stations are provided with the circuits of convertors 7 as well as of convertor 9.

Figure 4:
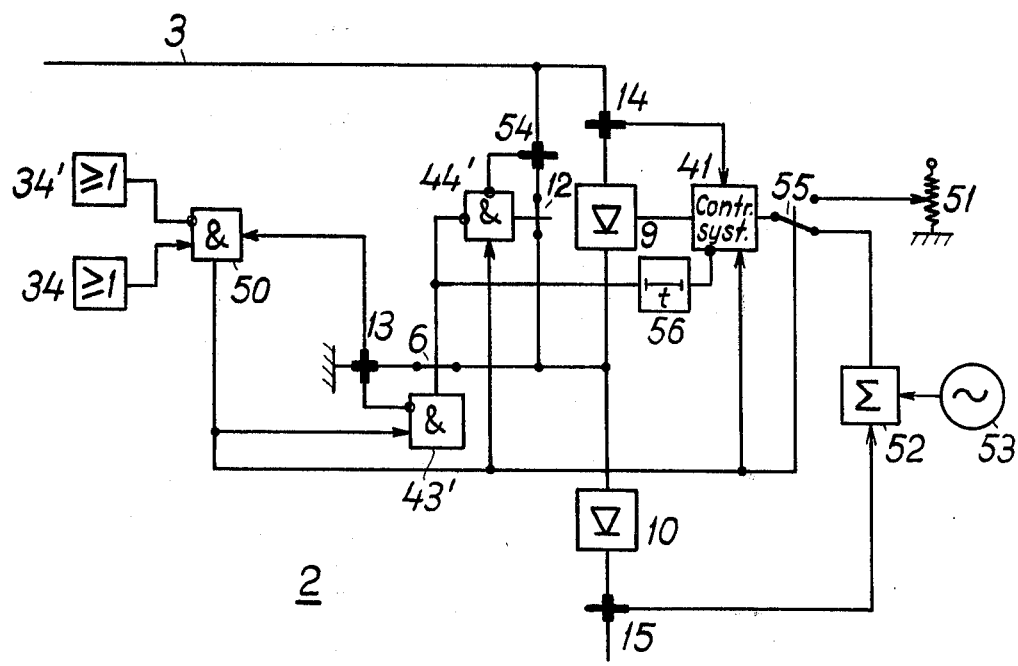

FIG. 4 shows the sequence of commutating current from the earth connection 5, 6 to connection 11, 3, 12 when both convertors 7 and 9 are already blocked and by-passed by 11 and 12, respectively. This case may be the most normal, as, in case of a fault, it may be desirable to make a number of disconnections, reconnections and a final disconnection of the whole pole as fast as possible without the interference according to FIG. 3 as mentioned earlier.

Thus FIG. 4 shows how convertor 9 is reconnected alone until the earth connections 5, 6 are currentless and one of them disconnected.

FIG. 4 shows station 2 with convertors 9 and 10 as in FIG. 1 and reference numerals as in FIGS. 1 and 3. According to FIG. 4, the whole pole A with its convertors 7 and 9 is finally blocked, for instance upon a fault in convertor 7, and the by-pass switches 11 and 12 as well as earth connections 5 and 6 are closed.

In order to make the current commutate from the earth connection over swiches 5, 6 to line 3, the blocking order from 34 in convertor 7 is fed to an AND-gate 50 together with the signal from transducer 13 showing that switch 6 is current carrying. A negative input on 50 is connected to the output from an OR-gate 34' for 9 corresponding to OR-gate 34 in convertor 7 in FIG. 3. As both convertors 7 and 9 are provided with the circuits of FIG. 4, a fault-free station is selected by 50 for driving the current through line 3.

The signal from 50 is fed to AND-gate 43' for switching-off 6, but, as 13 gives a current signal, 43' will not be active. Further, the signal from 50 is fed to the control system 41 similar to that shown in FIG. 3.

The signal from 50 also influences switch control 44' for by-pass switch 12 together with a negative current signal from a transducer 54 in series with 12. Consequently switch 12 is opened by 44' in a currentless state.

Control system 41 has an input for the actual current value of convertor 9 measured by transducer 14 and a reference value input over a two-way contact 55. During normal operation, 55 is in its upper position and connects a reference value emitter 51, symbolized by a potentiometer or the like, which is part of a main control system, not shown, for the whole transmission plant.

Contact 55 is influenced by the signal from 50 and switched to its lower position connecting transducer 15 to the reference input of control system 41.

In this way the current of convertor 9 is increased to the same value as that of convertor 10 so that the current of switch 6 commutates to convertor 9 and line 3. The start-up of convertor 9 under influence from 15 instead of 51 by means of 55 is also suitable for the case of FIG. 3 as mentioned above. Further, the opening of switch 6 may be facilitated if the signal from 15 is combined with a low frequency AC signal from an AC emitter 53 over a summation means 52. In this way the current over 6 will have pronounced zero passages so that any arcs in 6 will be extinguished. As described in connection with FIG. 3, the signal from 34 over 50 should influence the limit means of 41 in order to prevent over-voltages and over-currents during these conditions. Another possibility is to control convertor 9 by a device according to the above U.S. Pat. No. 3,641,556 which is switched on instead of 41.

When 6 has become currentless, it will be opened by a signal from AND-gate 43'. However, as mentioned above in FIG. 3, it is the same whether it is 5 or 6 which is opened. On the other hand, as mentioned earlier, one of them should remain closed in order to fix the potential of the whole plant.

After opening of switch 6, switch 12 should be finally closed and convertor 9 finally blocked, for instance by the signal from 43' over delay device 56.

FIGS. 3 and 4 show two different ways of activating line 3 and disconnecting 5 or 6. The two ways may complement each other or possibly be combined and should be seen as possibilities according to the invention. Above all, they have to be matched together with other existing control and protection systems which may involve modifications with respect to sequence and time delay of different steps. The principal idea is that, in order to make the current commutate from the earth connection to the free line, one of the convertors of the disconnected pole is loaded with a current equal to that of the fault-free pole in operation.

I claim:

1. In the operation of a bipolar direct-current transmission system comprising bipolar convertor stations (1,2) with earthed center taps (5,6) and connected to each other by means of two transmission lines (3,4), one for each polarity (A,B), and in which in the event of disconnection of one pole of the station the corresponding pole of the transmission line is connected as a return conductor for the remaining pole, the method which comprises, for loading said return conductor with current and discharging the ground connection between the stations, the step of increasing the current of the corresponding pole in one of the stations to the same value as in the pole in operation, and thereafter interrupting the ground connection in one station.

2. Method according to claim 1, in which in each station (1,2) the connection of the center tap of the station to earth is made by way of a switch member (5,6), which comprises measuring the current in the connection and interrupting the ground connection when the current is substantially zero in the corresponding breaker member.

3. Method according to claim 1, which comprises, when increasing the current in said corresponding pole in one station, controlling one part of the pole towards rectifying and the other part towards inverting operation.

4. Method according to claim 1, which comprises, when increasing the current of a pole in one station, increasing the current to a value which is alternately greater and less than the current in the pole which is in operation.

5. Method according to claim 1, which comprises, when increasing the current of a pole in one station, maintaining the voltage in the pole within predetermined low limits.

6. Direct-current transmission system, which comprises bipolar convertor stations (1,2) with at least one convertor (7-10) in each pole and in which each station is provided with an openable ground connection (5,6) of its center tap and with by-pass members (11,12) for each pole, means for controlling one pole of a station in case of a fault in said pole comprising current control means for adjusting the current of said pole of the station to the same value as that of the other pole of the station, and means for thereafter opening the ground connection of said pole.

7. Direct-current transmission system according to claim 6, including means (13 or 14,15) for measuring the current in said ground connection (5,6) before opening these.

8. Direct-current transmission system according to claim 6, said adjusting means includes means for increasing the current in said pole by the method, means for two parts of the pole for controlling one part towards rectifying and the other part towards inverting operation.

9. Direct-current transmission system according to claim 6, in which each pole of a station includes fault-indicating means, said fault-indicating means activating said current control means of the corresponding pole of the other station.

* * * * *